United States Patent
Aramaki et al.

(10) Patent No.: US 6,794,463 B2
(45) Date of Patent: Sep. 21, 2004

(54) BLOCK COPOLYMER

(75) Inventors: Masaaki Aramaki, Nobeoka (JP);
Takashi Saitou, Saitama (JP);
Tomofumi Maekawa, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/240,010

(22) PCT Filed: Mar. 28, 2001

(86) PCT No.: PCT/JP01/02545

§ 371 (c)(1),
(2), (4) Date: Sep. 27, 2002

(87) PCT Pub. No.: WO01/72872

PCT Pub. Date: Oct. 4, 2001

(65) Prior Publication Data

US 2003/0171494 A1 Sep. 11, 2003

(30) Foreign Application Priority Data

Mar. 28, 2000 (JP) ........................................ 2000-088285

(51) Int. Cl.⁷ .......................... C08L 77/00; C08L 67/00; C08L 69/00

(52) U.S. Cl. ...................... 525/425; 525/432; 525/437; 525/439; 525/444

(58) Field of Search ................................ 525/425, 432, 525/437, 439, 444

(56) References Cited

U.S. PATENT DOCUMENTS

| | | | |
|---|---|---|---|
| 4,417,031 A | 11/1983 | Aharoni et al. | |
| 4,417,032 A | 11/1983 | Khanna et al. | |

FOREIGN PATENT DOCUMENTS

| | | |
|---|---|---|
| JP | 9-208678 | 8/1997 |
| JP | 10-182801 | 7/1998 |

*Primary Examiner*—Ana Woodward
(74) *Attorney, Agent, or Firm*—Birch, Stewart, Kolasch & Birch, LLP

(57) ABSTRACT

Block copolymer comprising at least two kinds of polymer components each having a different structural unit in the polymer selected from polyamide, polyester, polycarbonate and polyarylate. The present block copolymer has a distinguished moldability and can be produced even from rework products or recycle products in a simple and economical manner.

20 Claims, No Drawings

BLOCK COPOLYMER

This application is the national phase under 35 U.S.C. §371 of PCT International Application No. PCT/JP01/02545 which has an International filing date of Mar. 28, 2001, which designated the United States of America.

TECHNICAL FIELD

The present invention relates to a block copolymer, and more particularly to a block copolymer with a distinguished moldability, which can be simply and economically produced even from rework products or recycle products, and which is also capable of producing moldings distinguished in rigidity at high temperatures, heat resistance, chemical resistance, surface appearance, etc.

BACKGROUND ART

Polyamides, polyesters, polycarbonates and polyarylates are known as engineering plastics and are widely used as materials for various parts in the versatile consumer goods fields including packaging, containers, etc., the automobile field, the electric and electronic field, the machinery and industrial product field, the office-equipment field, the aviation and space development field, etc.

To attain higher integration and higher weight, demands for substituting engineering plastics for metallic materials have been recently much intensified in these various fields of part materials, and as a result the performance level required for the engineering plastics has been made much higher. Specifically, resin materials having an appearance substitutable for the metallic materials and applicable to severe circumstances such as excessive exposure to heat, light, chemicals, etc. have been keenly desired. From the environmental viewpoint, on the other hand, the spur to reuse moldings and parts of the engineering plastics as rework or recycle products has been also intensified.

To meet these intensified demands for the engineering material characteristics, methods for blending mixtures of different kinds of resin components with a compatibilizing agent by melt kneading, that is, polymer alloy technology, have been so far studied to improve their performances while making up for disadvantages of single resin materials. It is well known that the materials based on the polymer alloy technology have been already commercially available.

However, in improvement of the compatibility of different kinds of thermoplastic resins, the polymer alloy technology still suffers from economical problems such as requirements for special compatibilizing agents and for modification of molecular structures of resins per se.

To overcome the above-mentioned problems, a more economical and easier method than the polymer alloy technology, that is, a method using mixtures of different kinds of resin components together with a reaction catalyst has been now under study. Specifically, U.S. Pat. No. 4,417,032 discloses a method for producing a somewhat random copolymer by melt-blending two or more kinds of homopolymers of polyamide in the presence of a phosphite ester compound. U.S. Pat. No. 4,417,031 discloses a method for producing graft and/or block copolymers by reaction of two or more kinds of homopolymers of polyamide, polyester and β-unsaturated carboxylic acid. JP-A-6-62846 discloses a method for melt-blending polyamide with polyester in the presence of an arylphosphoryl azide compound. Japanese Patent No. 2,721,479 discloses a resin composition comprising a mixture of polybutylene terephthalate having a specific viscosity with polyester, and a specific phosphorus compound. Furthermore, Japanese Patent No. 2,999,546 discloses a method for adjusting a melt flow rate by mixing a mixture of at least two kinds of thermoplastic resins selected from polyamide, polyester, polyarylate, etc. with a filler such as glass fibers, etc. followed by melt kneading under reduced pressure.

DISCLOSURE OF THE INVENTION

All of the above-mentioned prior arts comprise controlling the compatibility of resin mixtures on the basis of exchange reactions of polyamide-polyamide, polyamide-polyester, polyester-polycarbonate, etc. According to the present inventors' study, control of the exchange reactions has not yet been satisfactory, so that the intensified demands for the engineering material characteristics in various uses have not been satisfied. It is under the present status that their development into various uses is considerably restricted.

The present invention has been established to overcome the above-mentioned problems, and an object of the present invention is to provide a block copolymer having a distinguished moldability for forming various parts, etc., and which is producible from rework products or recycle products as raw materials and also capable of producing moldings distinguished in rigidity at high temperatures, heat resistance, chemical resistance, surface appearance, etc.

As a result of intensive studies to attain the object of the present invention, the present inventors have successfully found that the object of the present invention can be attained by using a block copolymer comprising specific polymer components and having a specific relation between the glass transition temperatures of the individual polymer components and the glass transition temperature of the resulting block copolymer, and have established the present invention.

That is, the present invention includes the following aspects [1]–[18] of the invention.

[1] A block copolymer comprising at least two kinds of polymer components each having a different structural unit in the polymer, (B) a phosphite ester compound and (C) a phosphite metal salt and/or a hypophosphite metal salt, where the polymer components are melt kneaded with the components (B) and (C), where the polymer components are selected from the group consisting of polyamide, polyester, polycarbonate and polyarylate, Y given by the following formula (1) is 0.1–0.9:

$$Y = \frac{1}{m}\sum_{j=1}^{m} \left| \frac{Tg_j - X}{Tg_j^{(A)} - X} \right|$$

(wherein m is the number of glass transition temperatures of the block copolymer, $Tg_j$ is the glass transition temperature (° C.) of the block copolymer, $Tg^{(A)}_j$ is the glass transition temperature (° C.) of the polymer component nearest to $Tg_j$ among the glass transition temperatures of the polymer components, and X is given by the following formula (2):

$$X = \sum_{i=1}^{n} Tg^{(B)}_i w_i$$

wherein n is the number of polymer components, $Tg^{(B)}_i$ is the glass transition temperatures (° C.) of the individual polymer components and $w_i$ is the weight ratios of the individual polymer components).

[2] A block copolymer as described in said [1], wherein the difference in the glass transition temperature between the polymer components constituting the block copolymer is 50° C. or higher.

[3] A block copolymer as described in said [1], wherein the block copolymer has a weight average molecular weight (Mw) of 20,000–200,000.

[4] A block copolymer as described in said [1], wherein the block copolymer comprises at least two kinds of polyamides.

[5] A block copolymer as described in said [1], wherein the block copolymer comprises polyamide and polyester.

[6] A block copolymer as described in said [1], wherein the block copolymer comprises at least two kinds of polyesters.

[7] A block copolymer as described in said [1], wherein the block copolymer comprises polyester and polycarbonate.

[8] A block copolymer as described in said [1], wherein the polyamide is selected from the group consisting of polycaprolactam, polyhexamethylene adipamide, polyhexamethylene dodecamide, polyhexamethylene isophthalamide, polyhexamethylene terephthalamide, polyhexamethylene cyclohexylamide and their copolymers.

[9] A block copolymer, as described in said [1], wherein the polyester is selected from the group consisting of polyethylene terephthalate, polytrimethylene terephthalate and polybutylene terephthalate.

[10] A block copolymer, as described in said [1], wherein the block copolymer has an average sequence length of 10–50 determined by nuclear magnetic resonance ($^{13}$C—NMR).

[11] A process for producing a block copolymer, which comprises melt kneading (A) at least two kinds of polymer components each having a different structural unit in the polymer and selected from the group consisting of polyamide, polyester, polycarbonate and polyarylate, with (B) a phosphite ester compound and (C) a phosphite metal salt and/or a hypophosphite metal salt.

[12] A process for producing a block copolymer, as described in said [11], wherein the polymer components (A) are at least two kinds of polyamides.

[13] A process for producing a block copolymer, as described in said [11], wherein the polymer components (A) are polyamide and polyester.

[14] A process for producing a block copolymer, as described in said [11], wherein the polymer components (A) are at least two kinds of polyesters.

[15] A process for producing a block copolymer, as described in said [11], wherein the polymer components (A) are polyester and polycarbonate.

[16] A process for producing a block copolymer, as described in said [11], wherein the proportion of the component (B) is 0.05–10 parts by weight and the proportion of the component (C) is 0.05–10 parts by weight on the basis of 100 parts by weight of the polymer components (A).

[17] A process for producing a block copolymer, as described in said [11], wherein a molecular weight-controlling agent (D) is further melt kneaded.

[18] A process for producing a block copolymer, as described in said [17], wherein the proportion of the component (D) is 0.05–10 parts by weight on the basis of 100 parts by weight of the polymer components (A).

BEST MODE FOR CARRYING OUT THE INVENTION

The block copolymer of the present invention comprises at least two kinds of polymer components each having a different structural unit in the polymer. Further, the polymer components must be selected from the group consisting of polyamide, polyester, polycarbonate and polyarylate.

The term "at least two kinds of polymer components each having a different structural unit in the polymer" means not only combinations of different polymer species such as polyamide and polyester or polyamide and polycarbonate, but also combinations of the same polymer species such as polyamides themselves or polyesters themselves, so far as structural units of the individual polymer species are different from one another, because the latter can satisfy such requirements for the present invention as defined by the term "at least two kinds of polymer components each having a different structural unit in the polymer". For example, when the polymer components are polyamide 66, whose structural units are hexamethylenediamine and adipic acid, and polyamide 6I, whose structural units are hexamethylenediamine and isophthalic acid, both the polyamide 66 and the polyamide 6I are included in such a definition of the present invention as given by the term "at least two kinds of polymer components each having a different structural unit in the polymer" because the dicarboxylic acid components as the structural units are different from each other (e.g. adipic acid and isophthalic acid). Likewise, even if the copolymer components are polyamide 66, whose structural units are hexamethylenediamine and adipic acid, polyamide 6I, whose structural units are hexamethylenediamine and isophthalic acid, and polyamide 6, whose structural unit is caprolactam, they are included in such a definition as given by the term "at least two kinds of polymer components each having a different structural unit in the polymer".

Description will be made below of polyamide, polyester, polycarbonate and polyarylate as polymer components constituting the present block copolymer.

Polyamide for use in the present invention is not particularly limited, so long as it is a polymer having an amide bond (—NHCO—) in the main chain, and can include, for example, polycaprolactam (polyamide 6), polytetramethylene adipamide (polyamide 46), polyhexamethylene adipamide (polyamide 66), polyhexamethylene sebacamide (polyamide 610), polyhexamethylene dodecamide (polyamide 612), polyundecamethylene adipamide (polyamide 116), polyundecalactam (polyamide 11), polydodecalactam (polyamide 12), polytrimethylhexamethylene terephthalamide (polyamide TMHT), polyhexamethylene isophthalamide (polyamide 6I), polynonanomethylene terephthalamide (polyamide 9T), polyhexamethylene terephthalamide (polyamide 6T), polyhexamethylene cyclohexylamide (polyamide 6C), polybis(4-aminocyclohexyl) methane dodecamide (polyamide PACM 12), polybis(3-methylaminocyclohexyl)methane dodecamide (polyamidedimethyl PACM 12), polymetaxylylene adipamide (polyamide MXD6), polyundecamethylene hexahydroterephthalamide (polyamide 11T(H)), and polyamide copolymers comprising at least two kinds of different polyamides selected from the abovementioned polyamides. Above all, preferable polyamides for attaining the object of the present invention include polycaprolactam (polyamide 6), polyhexamethylene adipamide (polyamide 66), polyhexamethylene dodecamide (polyamide 612), polyhexamethylene isophthalamide (polyamide 6I), polyhexamethylene terephthalamide (polyamide 6T), polyhexamethylene cyclohexylamide (polyamide 6C), and polyamide copolymers comprising at least two kinds of different polyamides selected from the above-mentioned polyamides.

The molecular weight of the polyamide of the present invention is, in terms of weight average molecular weight (Mw), preferably 10,000–1,000,000, more preferably 15,000–500,000, most preferably 20,000–200,000, from the viewpoints of moldability and mechanical properties of the resulting block copolymers. Weight average molecular weight can be determined by gel permeation chromatography (GPC), using hexafluoroisopropanol (HFID) as a solvent and using polymethyl methacrylate (PMMA) as a molecular weight reference material.

Polyester for use in the present invention is not particularly limited, so long as it is a polymer having an ester bond in the main chain, and can include, for example, (i) aromatic polyester, (ii) polyester thermoplastic elastomer (iii) liquid crystal polyester, etc.

Aromatic polyester (i) is a thermoplastic polyester having an aromatic ring as a structural unit in the polymer, and includes, for example, polymers or copolymers, obtained by condensation reaction of an aromatic dicarboxylic acid (or an ester-formable derivative) and a diol (or an ester-formable derivative) as the main components.

Aromatic dicarboxylic acid can include, for example, terephthalic acid, isophthalic acid, orthophthalic acid, 1,5-naphthalenedicarboxylic acid, 2,6-naphthalenedicarboxylic acid, 4,4'-diphenyldicarboxylic acid, 3,3'-diphenyldicarboxylic acid, 4,4'-diphenyletherdicarboxylic acid, 4,4'-diphenylmethanedicarboxylic acid, 4,4'-diphenylsulfonedicarboxylic acid, 4,4'-diphenylisopropylidonedicarboxylic acid, 1,2-bis-(phenoxy)ethane-4,4'-dicarboxylic acid, 2,5-anthracenedicarboxylic acid, 4,4'-p-terphenylenedicarboxylic acid, 2,5-pyridinedicarboxylic acid, etc. Above all, terephthalic acid and isophthalic acid are preferable.

Diol component can include, for example, aliphatic diols such as ethylene glycol, propylene glycol, 1,4-butanediol, neopentyl glycol, 1,5-pentanediol, 1,6-hexanediol, 2-methyl-1,3-propanediol, diethylene glycol, triethylene glycol, decamethylene glycol, etc.; alicyclic diols such as 1,4-cyclohexanedimethanol, etc.; and their mixtures. Long-chain diols having a molecular weight of about 400—about 6,000 such as polyethylene glycol, poly-1,3-propylene glycol, polytetramethylene glycol, etc. or copolymers of their mixtures may be also used, so long as they are in a small proportion.

Aromatic polyester can include, for example, aromatic polyesters such as polyethylene terephthalate, polytrimethylene terephthalate, polybutylene terephthalate, polyhexamethylene terephthalate, polycyclohexanedimethylene terephthalate, polyethylene-2,6-naphthalene dicarboxylate, polybutylene-2,6-naphthalene dicarboxylate, polyethylene-1,2-bis(phenoxy)ethane-4,4'-dicarboxylate, etc.; and aromatic polyester copolymers such as polyethylene isophthalate/terephthalate, polybutylene isophthlate/terephthalate, polybutylene terephthalate/decanedicarboxylate, etc. Above all, polyethylene terephthalate, polytrimethylene terephthalate and polybutylene terephthalate are preferable from the viewpoints of moldability and mechanical properties of the resulting block copolymers.

Polyester thermoplastic elastomer (ii) contains aromatic polyester as a hard segment and poly(alkylene oxide) glycol and/or aliphatic polyester as a soft segment, and can include, for example, polyether-ester block copolymer, polyester-ester block copolymer, polyether-ester-ester copolymer, etc.

A ratio of aromatic polyester hard segment/soft segment in the polyester thermoplastic elastomer is preferably 95/5–10/90 by weight, particularly 90/10–30/70 by weight.

Hard segment-constituting aromatic polyester is preferably a polymer obtained by polycondensation of dicarboxylic acid component, about 60% by mole or more of which is usually terephthalic acid component, and diol component. It is preferable to use as other dicarboxylic acid components than terephthalic acid and diol component those mentioned in reference to the aromatic polyester (i), specifically, for example, polyethylene terephthalate, polybutylene terephthalate, polyethylene (terephthalate/isophthalate), polybutylene (terephthalate/isophthalate), etc. and their mixtures.

Soft segment-constituting poly(alkylene oxide) glycol and aliphatic polyester, on the other hand, can include, for example, polyethylene glycol, poly(1,2-and 1,3-propylene oxide) glycol, poly(tetramethylene oxide) glycol, copolymer of ethylene oxide and propylene oxide, copolymer of ethylene oxide and tetrahydrofuran, polyethylene adipate, poly-ε-caprolactone, polyethylene sebacate, polybutylene sebacate, etc., and their mixtures.

Polyester thermoplastic elastomer can include, for example, polyethylene terephthalate.poly(tetramethylene oxide) glycol block copolymer, polyethylene terephthalate/isophthalate.poly(tetramethylene oxide) glycol copolymer, polybutylene terephthalate.poly(tetramethylene oxide) glycol block copolymer, polybutylene terephthalate/isophthalate.poly(tetramethylene oxide) glycol block copolymer, polybutylene terephthalate/decanedicarboxylate.poly(tetramethylene oxide) glycol block copolymer, polyethylene terephthalate poly(propylene oxide/ethylene oxide) glycol block copolymer, polybutylene terephthalate.poly(propylene oxide/ethylene oxide) glycol block copolymer, polybutylene terephthalate/isophthalate.poly(propylene oxide/ethylene oxide) glycol block copolymer, polybutylene terephthalate/decanedicarboxylate.poly(propylene oxide/ethylene oxide) glycol block copolymer, polybutylene terephthalate.poly(ethylene oxide) glycol block copolymer, polyethylene terephthalate.poly(ethylene oxide) glycol block copolymer, polybutylene terephthalate.polyethylene adipate block copolymer, polybutylene terephthalate polybutylene adipate block copolymer, polybutylene terephthalate.polybutylene sebacate block copolymer, polybutylene terephthalate.poly-ε-caprolactone block copolymer, etc.

Molecular weight of the aromatic polyester and polyester thermoplastic elastomer is, in terms of weight average molecular weight (Mw), preferably 10,000–1,000,000, more preferably 15,000–500,000, most preferably 20,000–200,000, from the viewpoints of moldability and mechanical properties of the resulting block copolymers. Weight average molecular weight can be determined by gel permeation chromatography (GPC), using hexafluoroisopropanol as a solvent and polymethyl methacrylate (PMMA) as a molecular weight reference material.

Liquid crystal polyester (iii) is a polyester called "thermotropic liquid crystal polymer, which can form an anisotropic melt at a temperature of 400° C. or lower, and can include, for example, those based on combinations of aromatic dicarboxylic acid, aromatic diol and aromatic hydroxycarboxylic acid, combinations of different kinds of aromatic hydroxycarboxylic acid, combinations of aromatic dicarboxylic acid and aromatic diol, those obtained by reaction of polyester such as polyethylene terephthalate, etc. with aromatic hydroxycarboxylic acid, etc. In place of these aromatic dicarboxylic acid, aromatic diol and aromatic hydroxycarboxylic acid, ester-formable derivatives thereof may be used in some cases.

Aromatic dicarboxylic acids represented by the following formulae can be used.

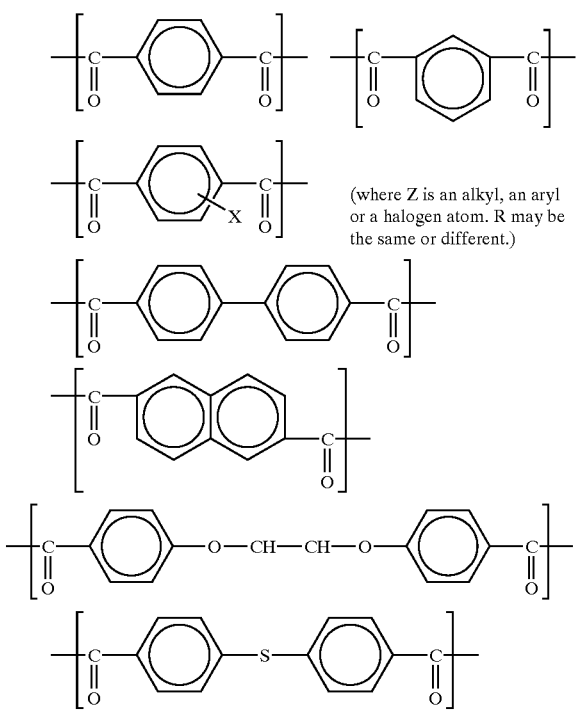

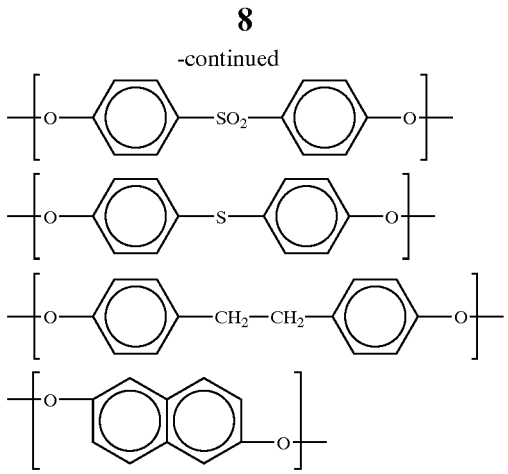

Aromatic diols represented by the following formulae can be used.

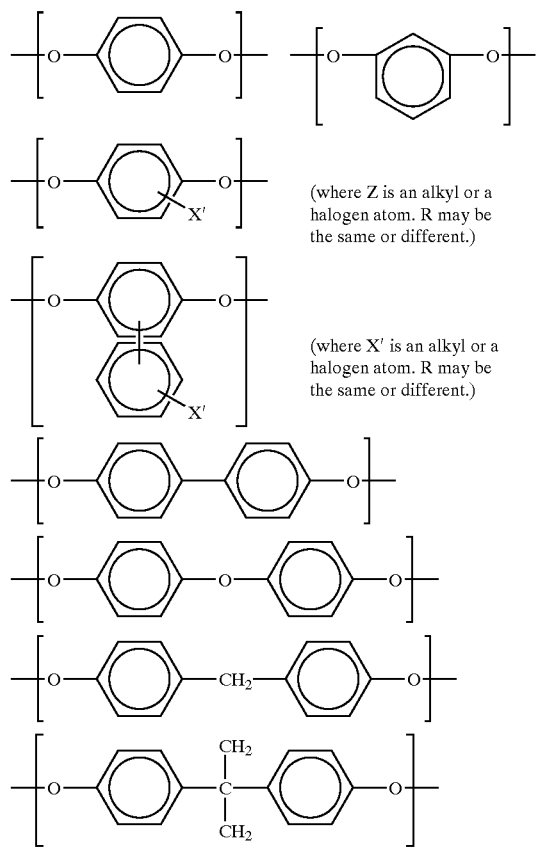

Aromatic hydroxycarboxylic acids represented by the following formulae can be used.

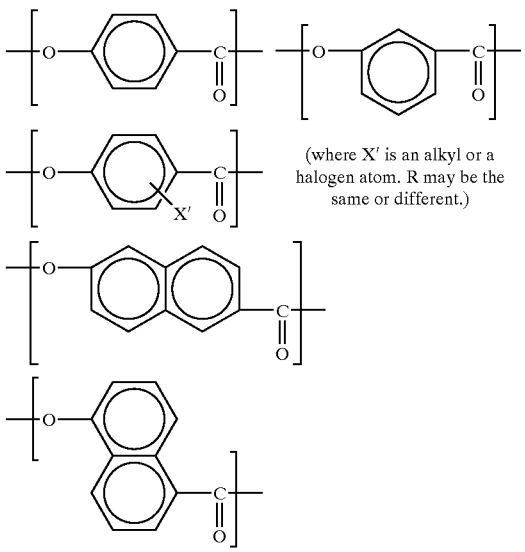

Molecular weight of liquid crystal polyester is, in terms of weight average molecular weight, preferably 10,000–1,000,000, more preferably 15,000–500,000, most preferably 20,000–200,000 from the viewpoints of moldability and mechanical properties of the resulting block copolymers. Weight average molecular weight can be determined by gel permeation chromatography (GPC), using a solvent mixture of hexafluoroisopropanol and pentafluorophenol (mixing ratio: 1/1 by weight) as a solvent and polymethyl methacrylate (PMMA) as a molecular weight reference material.

Polycarbonate for use in the present invention is selected from aromatic homopolycarbonates and aromatic-aromatic copolycarbonates, and includes, for example, those obtained by a phosgene process comprising injecting phosgene to a bifunctional phenolic compound in the presence of a caustic alkali and a solvent or by a transesterification process comprising conducting transesterification between the bifunctional phenolic compound and carbonate diester in the presence of a catalyst.

The bifunctional phenolic compound is represented by the following formula:

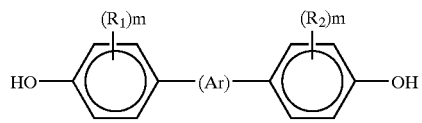

where $R_1$ and $R_2$ are hydrogen atoms, alkyls having 1–10 carbon atoms or halogen atoms, m and n show the numbers of substituents and are integers of 0–4, and (Ar) shows one of the following formulae:

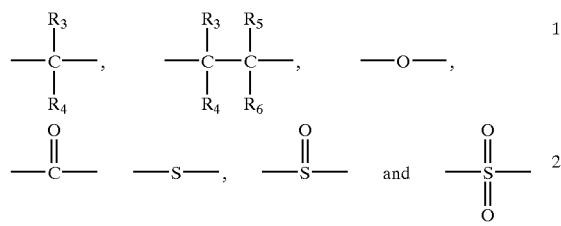

where $R_3$, $R_4$, $R_5$ and $R_6$ are hydrogen atoms, alkyls having 1 to 10 carbon atoms or phenyls; $R_3$ and $R_4$ may be joined together to form a ring; and $R_1$, $R_2$, $R_3$, $R_4$, $R_5$ and $R_6$ may be the same or different.

Bifunctional phenolic compound can include, for example, bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-t-butylphenyl)propane, 2,2-bis(4-hydroxy-3-bromophenyl)propane, 1,1-bis(4-hydroxyphenyl)-cyclopentane, 1,1-bis(4-hydroxyphenyl)cyclohexane, 4,4'-dihydroxydiphenyl ether, 4,4'-dihydroxy-3,3'-dimethylphenyl ether, 4,4'-dihydroxyphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenylsulfone, 4,4'-dihydroxy-3,3'-dimethyldiphenylsulfone, and their mixtures. Above all, 2,2'-bis(4-hydroxyphenyl)propane, i.e. bisphenyl A or 1,1-bis(4-hydroxyphenyl)cyclohexane is particularly preferable.

Carbonate diester can include, for example, diphenyl carbonate, ditolyl carbonate, bis(chlorophenyl)carbonate, m-cresyl carbonate, dinaphthyl carbonate, bis(diphenyl) carbonate, diethyl carbonate, dimethyl carbonate, dibutyl carbonate, dicyclohexyl carbonate, etc. Above all, diphenyl carbonate is preferable.

Molecular weight of the aromatic polycarbonate of the present invention is, in terms of weight average molecular weight (Mw), preferably 10,000–1,000,000, more preferably 15,000–500,000, most preferably 20,000–200,000, from the viewpoints of moldability and mechanical properties of the resulting block copolymers. Weight average molecular weight can be determined by gel permeation chromatography (GPC), using chloroform as a solvent and polystyrene (PS) as a molecular weight reference material.

Polyarylate for use in the present invention is prepared by a melt polymerization process comprising reacting a bifunctional phenolic compound with an aromatic dicarboxylic acid in a hot melt state, by a solution polymerization process comprising reacting a bifunctional phenolic compound with an aromatic dicarboxylic acid dichloride in an organic solvent in the presence of an amine as a deoxidant, by an interfacial polymerization comprising dissolving a bifunctional phenolic compound and an aromatic dicarboxylic acid dichloride into two kinds of non-intermiscible solvents and conducting polycondensation reaction at the interface while mixing the two solutions in the presence of an alkali by stirring, etc.

Bifunctional phenolic compound can be represented by the following formula:

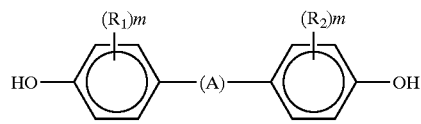

where $R_1$ and $R_2$ are hydrogen atoms, alkyls having 1 to 10 carbon atoms or halogen atoms; m and n show the numbers of substituents and are integers of 0–4; and (A) are represented by the following formulae:

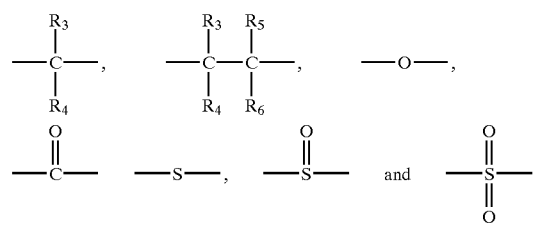

where $R_3$, $R_4$, $R_5$ and $R_6$ are hydrogen atoms, alkyls having 1 to 10 carbon atoms or phenyls; $R_3$ and $R_4$ may be joined together to form a ring; and $R_1$, $R_2$, $R_3$, $R_4$, $R_5$ and $R_6$ may be the same or different.

Bifunctional phenolic compound can include, for example, bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-t-butylphenyl)propane, 2,2-bis(4-hydroxy-3-bromophenyl)propane, 1,1-bis(4-hydroxyphenyl)cyclopentane, 1,1-bis(4-hydroxyphenyl)cyclohexane, 4,4'-dihydroxydiphenyl ether, 4,4'-dihydroxy-3,3'-dimethylphenyl ether, 4,4'-dihydroxyphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenylsulfone, 4,4'-dihydroxy-3,3'-dimethyldiphenylsulfone, and their mixtures. Above all, 2,2-bis(4-hydroxyphenyl)propane, i.e. bisphenol A and 1,1-bis(4-hydroxyphenyl)cyclohexane are preferable.

Aromatic dicarboxylic acid is not particularly limited, and can include, for example, terephthalic acid, isophthalic acid, naphthalenedicarboxylic acid, etc. or their mixtures, and also alkyl-substituted homologs and halides of these aromatic dicarboxylic acids or their mixtures.

Molecular weight of polyarylate is, in terms of weight average molecular weight (Mw), preferably 10,000–1,000,000, more preferably 15,000–500,000, most preferably 20,000–200,000, from the viewpoints of moldability and mechanical properties of the resulting block copolymers. Weight average molecular weight can be determined by gel permeation chromatography (GPC), using chloroform as a solvent and polymethyl methacrylate (PMKA) as a molecular weight reference material.

In the present invention, preferable block copolymers include, for example, block copolymers comprising at least two kinds of polyamide, block copolymers comprising polyamide and polyester, block copolymers comprising at least two kinds of polyester and block copolymers comprising polyester and polycarbonate.

The present block copolymer must have a specific relation between glass transition temperatures of the individual polymer components and glass transition temperature of the resulting block copolymer. That is, in the following formula (1) showing a relation between glass transition temperatures of the individual polymer components and glass transition temperature of the resulting block copolymer, the present block copolymer must satisfy such conditions as Y is in a range of 0.1–0.9, preferably 0.15–0.85, most preferably 0.2–0.7:

$$Y = \frac{1}{m}\sum_{j=1}^{m}\left|\frac{Tg_j - X}{Tg_j^{(A)} - X}\right|$$

(where m is the number of glass transition temperatures of the block copolymer, $Tg_j$ is the glass transition temperature (° C.) of the block copolymer, $Tg^{(A)}_j$ is the glass transition temperature (° C.) of the polymer component nearest to $Tg_j$ among the glass transition temperatures of the individual polymer components, and X is given by the following formula (2):

$$X = \sum_{i=1}^{n} Tg^{(B)}_i w_i$$

where n is the number of polymer components, $TG^{(B)}_i$ is the glass transition temperatures of the individual polymer components and $w_i$ is the ratios by weight of the individual polymer components).

Glass transition temperatures of the individual polymer components and block copolymers can be determined by differential scanning calorimetry (DSC) according to JIS K7121, using samples obtained by reducing contents of water, hydrophilic solvent and the like to less than 0.1% by weight by drying and the like, or by a method for determining dependency of dynamic viscoelasticity on temperature according to JIS k7198, or by M-DSC (Modulated-DSC).

The present block copolymer can have a single glass transition temperature in one case and a plurality of glass transition temperatures in another case. Thus, the above-mentioned $Tg^{(A)}_j$, i.e. glass transition temperature (° C.) of polymer component nearest to $Tg_j$ (glass transition temperature of block copolymer) among the glass transition temperatures of the individual polymer components can be determined from a relation between the value and number of glass transition temperatures of the block copolymer in the following manner.

For example, when the block copolymer comprises a polymer component P (glass transition temperature $Tg^{(B)}_1$=40° C.) and a polymer component Q (glass transition temperature $Tg^{(B)}_2$=100° C.), and the block copolymer has one glass transition temperature ($Tg_1$=80° C.), the glass transition temperature $Tg^{(B)}_2$ (100° C.) of polymer component Q is the nearest to the glass transition temperature $Tg_1$ (80° C.) among the glass transition temperatures of polymer components P and Q, and thus $Tg^{(A)}_1$=100.

When the block copolymer comprises a polymer component P (glass transition temperature $Tg^{(B)}_1$=40° C.) and a polymer component Q (glass transition temperature $Tg^{(B)}_2$=100° C.), and the block copolymer has two glass transition temperatures, i.e. $Tg_1$=50° C. and $Tg_2$=80° C., respectively, glass transition temperature $Tg^{(B)}_1$ (40° C.) is the nearest to glass transition temperature Tg1 (50° C.) of the block copolymer among the polymer components P and Q, and thus $Tg^{(A)}_1$=4° C., whereas glass transition temperature $Tg^{(B)}_2$ (100° C.) is the nearest to glass transition temperature $Tg_2$ (80° C.) of the block copolymer, and thus $Tg^{(A)}_2$=100° C.

When Y is less than 0.1 in the above-mentioned formula (1), the rigidity at high temperatures of the resulting moldings from the present block copolymers is liable to decrease, whereas above 0.9 the appearance of the moldings is liable to be degraded.

In the present invention, it is preferable that at least two kinds of polymer components have a difference of 50° C. or more in the glass transition temperature between the polymer components. When the present block copolymer comprises polymer components having a difference of less than 50° C. in the glass transition temperature therebetween, the rigidity at high temperatures and heat resistance of the resulting moldings are not thoroughly improved in some cases.

Molecular weight of the present block copolymer is, in terms of weight average molecular weight (Mw), preferably 20,000–200,000, more preferably 25,000–150,000, most preferably 30,000–150,000, from the viewpoints of moldability and mechanical properties. Weight average molecular weight can be determined by gel permeation chromatography (GPC), using one kind of solvent selected from chloroform, hexafluoroisopropanol and pentafluorophenol or a solvent mixture of at least two of these solvents as a solvent and polystyrene (PS) or polymethyl methacrylate (PMMA) as a molecular weight reference material.

The present block copolymer has an average sequence length of preferably 10–50, more preferably 15–50, much more preferably 20–50, most preferably 30–50, as determined by nuclear magnetic resonance ($^{13}$C—NMR). The average sequence length can be calculated according to J. Polym. Sci. Phys. ED. Vol. 20, page 1875 (1982). It should be taken into account that, when the average sequence length is less than 10, the rigidity at high temperatures is liable to decrease, whereas above 50 a poor appearance is liable to be observed.

Dispersion state of the present block copolymer can be observed by an electron microscope. For example, a microsection adjusted by dye fixation, using osmium tetroxide and/or ruthenium tetroxide, if required, can be observed by a transmission electron microscope (TEM), or a sample pretreated by an appropriate solvent capable of dissolving only the dispersed phase can be also observed by a scanning electron microscope (SEM).

Average particle size of the dispersed phase is preferably 0.01–30 μm, more preferably 0.01–10 μm. When the average particle size is outside the above-mentioned range, a decrease in the rigidity at high temperatures and poor appearance of moldings obtained from the block copolymer are more liable to take place. The average particle size can be calculated in the following manner. A section cut away from the block copolymer or the moldings is photographed. Then, diameter di and number ni of particles of dispersed phase are determined. Then, the average particle size is calculated by the following equation:

Average particle size=Σdi·ni/Σni where when the particle is not in a spherical shape, length of its major axis and length of its minor axis should be measured, and one-half of the sum total of both lengths should be referred to as particle size. In the calculation of average particle size, at least 100 particle sizes must be measured.

Description will be made below of a process for producing the present block copolymer. The process is not particularly limited, and any process can be used, so long as the resulting block copolymers can satisfy the condition that Y is in a range of 0.1–0.9 in the above-mentioned formula (1).

However, a preferable process is that which comprises melt kneading (A) at least two kinds of polymer components each having a different structural unit in the polymer and selected from the group consisting of polyamide, polyester, polycarbonate and polyarylate with (B) a phosphite ester compound and (C) a phosphite metal salt and/or a hypophosphite metal salt or a phosphate metal salt.

A more preferable process is that which comprises melt kneading (A) at least two kinds of polymer components each having a different structural unit in the polymer and selected from the group consisting of polyamide, polyester, polycarbonate and polyarylate with (B) a phosphate ester compound and (C) a phosphite metal salt and/or a hypophosphite metal salt. The most preferable process is that which comprises (A) melt kneading (A) at least two kinds of polymer components each having a different structural unit in the polymer and selected from the group consisting of polyamide, polyester, polycarbonate and polyarylate with (B) a phosphite ester compound, (C) a phosphite metal salt and/or a hypophosphite metal salt and (D) a molecular weight-controlling agent.

It should be taken into account that, when only a phosphate metal salt is used as Component (C), color tone deterioration and a decrease in the rigidity at high temperatures are liable to take place.

Phosphite ester compound (B) of the present invention can be represented by the following general formula:

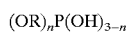

$(OR)_nP(OH)_{3-n}$ where R is an alkyl, a phenyl or a substituted alkyl, where part of the alkyl is replaced with a hydrocarbon group, etc.; n is 1, 2 or 3; and (OR) group may be the same or different.

R can include, for example, aliphatic groups such as methyl, ethyl, n-propyl, i-propyl, n-butyl, i-butyl, t-butyl, n-pentyl, n-hexyl, n-octyl, 2-ethylhexyl, decyl, lauryl, tridecyl, stearyl, oleyl, etc.; aromatic groups such as phenyl, biphenyl, etc.; aromatic groups, etc. with a substituent such as hydroxy, methyl, ethyl, propyl, t-butyl, nonyl, methoxy, ethoxy, etc.

Preferable phosphite ester compounds include, for example, ethyl phosphite, diethyl phosphite, dipropyl phosphite, dibutyl phosphite, diphenyl phosphite, trimethyl phosphite, triethyl phosphite, tripropyl phosphite, tributyl phosphite, trioctyl phosphite, tributoxyethyl phosphite, tris (2-ethylhexyl)phosphite, triphenyl phosphite, diphenylcresyl phosphite, tricresyl phosphite, biphenyl phosphite, tris (2,4-di-t-butylphenyl)phosphite, tris(1,5-di-t-butylphenyl) phosphite, tris(dimethylphenyl)phosphite, tris (isopropylphenyl)phosphite, octyldiphenyl phosphite, and their mixtures.

The content of the phosphite ester compound is preferably 0.05–10 parts by weight, more preferably 0.1–5 parts by weight, most preferably 0.5–2.5 parts by weight, on the basis of 100 parts by weight of the total of the polymer components (A). When the content is less than 0.05 parts by weight, the desired improvement effect of the present invention sometimes cannot be obtained, whereas above 10 parts by weight the extrudibility or molding processability is liable to decrease.

Phosphite metal salt (C) of the present invention includes metal salts of phosphorus acid with such metals as elements of Groups 1, 2, 3, 4, 5, 6, 7, 8, 11, 12 and 13 of the Periodic Table, and tin, lead, etc. These phosphite metal salts can be used alone or in combination of at least two thereof.

Hypophosphite metal salt (C) of the present invention includes metal salts of hypophosphorous acid with such metals as elements of Groups 1, 2, 3, 4, 5, 6, 7, 8, 11, 12 and 13 of the Periodic Table, and tin, lead, etc. These hypophosphite metal salts can be used alone or in combination of at least two thereof.

From the viewpoint of remarkably attaining the object of the present invention, preferable is a hypophosphite metal salt and most preferable are sodium hypophosphite $(NaH_2PO_2.H_2O)$ and calcium hypophosphite $(Ca(H_2PO_2)_2)$ or their mixture among them.

The content of the phosphite metal salt and/or hypophosphite metal salt is preferably 0.05–10 parts by weight, more preferably 0.1–5 parts by weight, most preferably 0.5–2.5 parts by weight, on the basis of 100 parts by weight of the total of the polymer components (A). When the content is less than 0.05 parts by weight, the desired improvement effect of the present invention sometimes cannot be obtained, whereas above 10 parts by weight the extrudibility or molding processability is liable to decrease.

When the phosphite ester compound (B) and the phosphite metal salt and/or hypophosphite metal salt (C) are melt kneaded together in the production of the present block copolymer, the phosphite ester compound (B) and the phosphite metal salt and/or hypophosphite metal salt (C) are incorporated into the block copolymer, but the state of occurrence of the phosphite ester compound (B) and the phosphite metal salt and/or hypophosphite metal salt (C) in the melt kneaded block copolymer is not particularly limited. For example, the phosphite ester or phosphite metal salt or hypophosphite metal salt may be found therein as they are or in the state of a phosphate ester or phosphate metal salt, or in a mixed state thereof, or in a hydrolyzed state of the phosphite ester compound or phosphite metal salt or hypophosphite metal salt, for example, in a state of phosphorous acid, hypophosphorcus acid, phosphoric acid or the like.

Molecular weight-controlling agent (D) of the present invention can include, for example, water, monocarboxylic acids such as acetic acid, stearic acid, etc.; dicarboxylic acids such as adipic acid, isophthalic acid, terephthalic acid, etc.; monoamines such as stearylamine, etc.; diamines such as hexamethylenediamine, etc.; carboxylic acid metal salts such as sodium acetate, calcium acetate, calcium stearate, etc., and their mixtures.

The content of the molecular weight-controlling agent is preferably 0.05–10 parts by weight, more preferably 0.1–5 parts by weight, most preferably 0.5–2.5 parts by weight, on the basis of 100 parts by weight of the total of the polymer components (A). When the content is less than 0.05 parts by weight, the desired improvement effect of the present invention sometimes cannot be obtained, whereas above 10 parts by weight, the extrudibility and molding processability are liable to decrease.

A method for melt kneading the polymer components (A) with the phosphite ester component (B), the phosphite metal salt and/or hypophosphite metal salt (C) and the molecular weight-controlling agent (D) is not particularly limited, and can include, for example, a method for kneading all the components at the same time, a method for kneading prekneaded blends, such as a method for melt kneading a prekneaded mixture of the polymer components with the phosphite ester compound and the phosphite metal salt together; a method for successively feeding the individual components on the way along an extruder, such as a method for successively feeding the phosphite ester compound, the phosphite metal salt, the hypophosphite metal salt, the molecular weight-controlling agent, etc. to the polymer components, on the way along the extruder, or combinations of these methods.

Any well known apparatus for carrying out melt kneading can be used. For example, melt kneaders such as a monoaxial or biaxial extruder, a Banbury mixer, mixing rolls, etc. are preferable. Above all, a biaxial extruder with a degassing mechanism (vent) and side feeders is most preferable.

Preferable conditions for melt kneading are a pressure reduction degree of about 0—about 0.07 Mpa, a kneading temperature of about 1—about 100° C. higher than the melting point or softening point of the polymer components determined by differential scanning calorimetry (DSC) according to JIS K7121, a kneader shearing speed of about 100 ($sec^{-1}$) or higher and an average kneader retention time of about 1—about 15 minutes. It should be taken into account that when the conditions are outside the above-mentioned ranges, lowering of the productivity and molding process-ability, unsatisfactory appearance of the resulting moldings and unsatisfactory improvement effect on the physical properties are sometimes liable to occur.

The present block copolymer can contain an oxide or a peroxide, which can include, for example, oxides or peroxides of elements of Group 1, 2, 3, 4, 5, 6, 7, 8, 11, 12, 13, 14 and 15 of the Periodic Table, or their mixtures. Preferable are oxides of Group 2, such as CaO, etc.; oxides of Group 4 such as $TiO_3$, $ZrO_2$, etc., oxides of Group 6 such as $CrO_3$, $MoO_3$, $WO_3$, etc.; oxides of Group 12 such as ZnO, etc.; oxides of Group 13 such as $B_2O_3$, $Al_2O_3$, etc.; oxides of Group 14 such as $SiO_2$, $GeO_2$, etc.; oxides of Group 15 such as $Sb_2O_3$, etc.; and oxides of Group 8 such as $Fe_2O_3$, $Fe_3O_4$, CoO, NiO, $Cu_2O$, etc.

The present block copolymer can contain a moldability-improving agent. The moldability-improving agent is at least one compound selected from compounds consisting of higher fatty acids, higher fatty acid esters, higher fatty acid amide compounds, polyalkylene glycols or their terminal-modified derivatives, low molecular weight polyethylene or oxidized low molecular weight polyethylene, substituted benzylidenesorbitol, polysiloxane, caprolactones and inorganic crystal nucleating agents.

The present block copolymer can further contain a deterioration inhibitor to prevent heat deterioration and coloring when heated and to improve heat aging resistance and weather resistance. The deterioration inhibitor is at least one compound selected from a phenolic stabilizer such as hindered phenol compounds, etc.; a phosphite-based stabilizer, a hindered amine-based stabilizer, a triazine-based stabilizer and a sulfur-based stabilizer.

The present block copolymer can contain a coloring agent. The coloring agent is at least one coloring agent selected from dyes such as Nigrosine, etc.; pigments such as titanium oxide, carbon black, etc.; metallic particles of aluminum, colored aluminum, nickel, tin, copper, gold, silver, platinum, iron oxide, stainless steel, titanium, etc.; and metallic pigments such as mica pearl pigments, color graphite, color glass fibers, color glass flakes, etc.

The present block copolymer can contain electroconductive carbon black. The electroconductive carbon black is at least one kind of carbon black selected from acetylene black, Ketjen black, carbon nanotube, etc. Above all, those with a good chain structure and with a high aggregation are preferable.

The present block copolymer can contain a flame retardant. Preferable flame retardant is a non-halogen-based flame retardant or a bromine-based flame retardant.

The non-halogen-based flame retardant is at least one flame retardant selected from a phosphorus-based flame retardant such as red phosphorus, ammonium phosphate, ammonium polyphosphate, etc.; a metal hydroxide or an inorganic metal compound hydrate such as aluminum hydroxide, magnesium hydroxide, dolomite, hydrotalcite, calcium hydroxide, barium hydroxide, basic magnesium carbonate, zirconium hydroxide, tin hydroxide, zinc hydroxide, hydroxy zinc stannate, etc., an inorganic compound-based flame retardant of boric acid compounds such as zinc borate, zinc metaborate, barium metaborate, etc.; a triazine-based flame retardant such as melamine, melam, melem, mellon (product obtained from 3 molecules of melem by trimolecular deammoniation at 300° C. or higher), melamine cyanurate, melamine phosphate, melamine polyphosphate, succinoguanamine, adipoguanamine, methylglutaroguanamine, melamine resin, etc.; and a silicone-based flame retardant such as silicone resin, silicone oil, silica, etc.

The bromine-based flame retardant is at least one flame retardant selected from compounds selected from brominated polystyrene, brominated polyphenylene ether, brominated bisphenol type epoxy polymers and bromine-based cross-linked aromatic polymers.

The present block copolymer can contain other polymer components than polyamide, polyester, polycarbonate and polyarylate. Preferable other polymer components are at least one polymer component selected from polyphenylene ether resin, polyoxymethylene resin, polyarylene sulfide resin, polyolefin resin, styrene resin, acrylic resin and rubber.

The present block copolymer can contain an inorganic filler. The inorganic filler is at least one inorganic filler selected from glass fibers, carbon fibers, wollastonite, talc, mica, kaolin, barium sulfate, calcium carbonate, apatite, sodium phosphate, fluorite, silicon nitride, potassium titanate, molybdenum disulfide, etc.

The present block copolymer has a good moldability and thus can be satisfactorily molded by well known molding methods such as well known plastic molding methods, for example, press molding, injection molding, gas-assisted injection molding, weld molding, extrusion molding, blow molding, film molding, inflation molding, multilayer molding, expansion molding, melt spinning, etc.

Furthermore, the present block copolymer can be produced even from rework products or recycle products as raw materials and thus recyclic application of various moldings or parts, for example, recyclic application of recovered polyethylene terephthalate (PET) can be conducted.

Furthermore, moldings obtained from the present block copolymer are more distinguished in rigidity at high temperatures, heat resistance, chemical resistance, surface appearance, weather resistance, heat aging resistance, etc. than those obtained from the conventional resin compositions and thus their application to automobile parts, electronic and electric parts, industrial machinery parts, various gears and various parts of extrusion use, etc. is a beneficial advantage of the invention.

EMBODIMENTS

The present invention will be described in detail below, referring to embodiments, which are not restrictive of the present invention, and the present invention shall be construed within the scope and spirit herein disclosed. Evaluation of physical properties in the following Examples and Comparative Examples was made as follows:

1. Characteristics of Polymer Components and Block Copolymers (1–1) Melting Point (° C.)

Determined according to JIS K7121, using Perkin-Elmer DSC-7 type as a measuring apparatus by keeping about 8 mg of a sample at 300° C. for 2 minutes in a nitrogen atmosphere, and then cooling it down to 40° C. at a cooling rate of 20° C./min., followed by keeping the sample at 40° C. for 2 minutes, and determining a melting point from the exothermic peak (melting peak) temperature, appearing when reheated at a heating rate of 20° C./min. as measurement conditions.

(1–2) Glass Transition Temperature (° C.)

Determined according to JIS K7121, using Perkin-Elmer DSC-7 type as a measuring apparatus by melting a sample on a hot stage (Mettler EP80) at first and quenching the melt sample in liquid nitrogen, thereby solidifying it as a sample for the measurement, and then heating 10 mg of the sample for the measurement to a range of 30°–300° C. at a heating rate of 20° C./min., thereby determining a glass transition temperature.

(1–3) Weight Average Molecular Weight (Mw)

Determined by gel permeation chromatography (GPC), using an apparatus HLC-8020, made by Tosoh Corp., a differential refractometer (RI) as a detector, at least one kind or a mixture of two or more solvents selected from chloroform, hexafluoroisopropanol and pentafluorophenol as a solvent, and two columns of TSK gel-GMHHR-H and one column of G1000HHR, made by Tosoh Corp. Solvent flow rate was 0.6 ml/min., sample concentration was 1–3 (mg sample)/1 (ml solvent), and insoluble matters were removed from a sample by filtration through a filter to obtain a sample for the measurement. Weight average molecular weight (Mw) was calculated from the resulting elution curve, using polystyrene (PS) or polymethyl methacrylate (PMMA) as a molecular weight reference material.

(1–4) Average Sequence Length

Determined by $^{13}C$—NMR, using FT-NMR, model DPZ-400, made by Bruker Corp., and d-sulfuric acid, d-hexafluoroisopropanol or d-chloroform as a solvent. Temperature was 25° C., sample concentration was 2 (mg sample)/10 (ml solvent), and tetramethylsilane (TMS) was used as a chemical shift basis. Measurement was made under such conditions as number of accumulation about 20,000 and waiting period: 3.0 sec. Average sequence length was calculated according to J. Polym. Sci. Phys. ED. Vol. 20, page 1875 (1982).

(1–5) Moisture Content (% by Weight)

Determined by Karl Fisher method, using 0.7 g of a sample for the measurement in a moisture vaporizer (Model VA-06, made by Mitsubishi Chemical Corp.) at a temperature of 185° C.

2. Preparation of Physical Properties of Moldings

Moldings were prepared from block copolymers by an injection molding machine Model PS40E, made by Nissei Jushi K. K. at a mold temperature of 80° C. under injection molding conditions of injection time: 17 sec. and cooling time: 20 sec. Cylinder temperature was set to a temperature of about 15°–40° C. higher than the melting points of block copolymers determined according to the conditions of said (1–1).

(2–1) Flexural Modulus and Flexural Strength (Mpa)

Determined according to ASTM D790.

(2–2) Tensile Strength (Mpa) and Tensile Elongation (%)

Determined according to ASTM D638.

(2–3) Notched Izod Impact Strength (J/m)

Determined according to ASTM D256.

(2–4) Surface Appearance

Gs 60° C. was measured according to JIS K 7150, using a handy glossmeter, model IG320, made by Horiba Sei-sakusho K. K.

(2–5) Color Tone (Value b)

Value b was determined by a color comparator Model ND-300A, made by Nihon Denshoku K. K. The smaller the value b, the better the color tone.

(2–6) Development State of Environmental Stress Cracks

An injection-molded test piece immersed in hot water at 80° C. for 4 hours was kept in a bent state under a constant stress of 75 Mpa and its surface was coated with an aqueous 30 wt. % calcium chloride solution. The test piece was left standing at 100° C. for 2 hours, and then the crack development state of the test piece was observed.

(2–7) Water Absorption (wt. %)

Molded test piece was immersed in water at 23° C. for 24 hours and water absorption was determined from a weight increment.

EXAMPLE 1

100 Parts by weight of polymer components consisting of 70 parts by weight of polyamide 66 (Leona 1300, made by ASAHI KASEI Corp., (moisture content: 0.08 wt. %), abbreviated to "PA66" in the following Tables) and 30 parts by weight of polyamide 6I (T40, made by Bayer, (moisture content: 0.01 wt. %), abbreviated to "PA6I" in the following Tables) were blended with 1.0 part by weight of tridecyl phosphite, 0.5 parts by weight of calcium hypophosphite and 0.5 parts by weight of adipic acid. Then, the blend was melt kneaded by a biaxial extruder (model TEM 35, made by Toshiba Machine Co., Ltd., biaxial, unidirectional screw-rotary type, L/D=47.6 (D=37 mm in diameter), while feeding 100 parts by weight of short glass fibers (JA416, made by Asahi Fiber Glass Co., Ltd., abbreviated to "GF" in the following Tables) through a side feeder on the basis of 100 parts by weight of the polymer components. Extrusion was conducted at a screw revolution rate of 300 rpm, a cylinder temperature of 280° C. (at a polymer temperature of 290° C. around the tip end nozzle), and a rate of 60 kg/hr (for a retention time of 2 minutes) without pressure reduction. Strand-formed polymer was discharged through the tip end nozzle, followed by water cooling and cutting to make pellets. The pellets were dried in a nitrogen atmosphere at 80° C. for 24 hours.

Glass transition temperature $Tg^{(B)}_1$ of polyamide 66 was 47.0° C., and glass transition temperature $Tg^{(B)}_2$ of polyamide 6I was 130° C., and parameter X=(47.0×0.7)+(130×0.3)=71.9° C. was calculated therefrom. Number of glass transition temperature of the resulting block copolymer pellets was one (m=1) and its value ($Tg_1$) was 62.0° C. Thus, among the glass transition temperatures of polyamide 66 and polyamide 6I, the glass transition temperature of polyamide 66 is nearer to the glass transition temperature of the block copolymer, i.e. $Tg^{(A)}_1$=47.0° C., and thus parameter $Y=|Tg_1-X|/|Tg^{(A)}_1-X|=|62.0-71.9|/|47.0-71.9|=0.40$ was calculated therefrom. Evaluation results of the resulting molding are shown in Table 1.

EXAMPLE 2

100 Parts by weight of polymer components consisting of 60 parts by weight of polyamide 66 (Leona 1300, made by ASAHI KASEI Corp., moisture content 0.08 wt. %)) and 40 parts by weight of polyamide 6I (T40, made by Bayer (moisture content: 0.01 wt. %) were blended with 1.0 part by weight of tridecyl phosphite, 0.5 parts by weight of calcium hypophosphite and 0.5 parts by weight of adipic acid. Block copolymer pellets were prepared thereafter by the same operations as in Example 1. Characteristics of polymer components and block copolymer and evaluation results of the resulting molding are shown in Table 1.

EXAMPLE 3

100 Parts by weight of polymer components consisting of 70 parts by weight of water absorption-treated polyamide 66 (Leona 1300, made by ASAHI KASEI Corp., (moisture content: 1.0 wt. %)) and 30 parts by weight of polyamide 6I (T40, made by Bayer (moisture content: 0.01 wt. %) were blended with 1.0 part by weight of tridecyl phosphite and 0.5 parts by weight of calcium hypophosphite. The blend was melt kneaded by a biaxial extruder (model TEM35, made by Toshiba Machine Co., Ltd., biaxial, unidirectional screw-rotary type, L/D=47.6 (D=37 mm in diameter)), while feeding 100 parts by weight of short glass fibers (JA416, made by Asahi Fiber Glass Co., Ltd.) through a side feeder on the basis of 100 parts by weight of the polymercomponents. Extrusion was conducted at a screw revolution rate of 300 rpm, a cylinder temperature of 280° C. (at a polymer temperature of 290° C. around the tip end nozzle), a rate of 60 kg/hr. (for a retention time of 2 minutes), and a pressure reduction degree of 0.04 MPa. Strand-formed polymer was discharged through the tip end nozzle, followed by water cooling and cutting to make pellets. The pellets were dried in a nitrogen atmosphere at 80° C. for 24 hours. Characteristics of polymer components and block copolymer and evaluation results of the resulting molding are shown in Table 1.

Comparative Example 1

100 Parts by weight of polymer components consisting of 60 parts by weight of polyamide 66 (Leona 130, made by ASAHI KASEI Corp., (moisture content 0.08 wt. %)) and 40 parts by weight of polyamide 6I (T40, made by Bayer (moisture content: 0.01 wt. %)) were blended with 0.5 parts by weight of calcium hypophosphite and 0.5 parts by weight of adipic acid. Block copolymer pellets were prepared thereafter by the same operations as in Example 1. Characteristics of polymer components and block copolymer and evaluation results of the resulting molding are shown in Table 1.

EXAMPLE 4

Block copolymer pellets were prepared in the same manner as in Example 1 except that triphenyl phosphite was used in place of tridecyl phosphite. Characteristics of polymer components and block copolymer, and evaluation results of the resulting molding are shown in Table 2.

EXAMPLE 5

Block copolymer pellets were prepared in the same manner as in Example 1 except that tris(2,4-di-t-butylphenyl) phosphite was used in place of tridecyl phosphate. Characteristics of polymer components and block copolymer, and evaluation results of the resulting molding are shown in Table 2.

EXAMPLE 6

Block copolymer pellets were prepared in the same manner as in Example 1 except that zinc phosphite was used in place of calcium hypophosphite. Characteristics of polymer components and block copolymer, and evaluation results of the resulting molding are shown in Table 2.

EXAMPLE 7

Block copolymer pellets were prepared in the same manner as in Example 1 except that zinc phosphate was used in place of calcium hypophosphite. Characteristics of polymer components and block copolymer, and evaluation results of the resulting molding are shown in Table 2.

EXAMPLE 8

100 Parts by weight of polymer components consisting of 70 parts by weight of polyamide 6 (SF1013A, made by Ube Industries, Ltd. (moisture content: 0.08 wt. %), abbreviated to "PA6" in the following Tables) and 30 parts by weight of polyamide 6I (T40, made by Bayer (moisture content: 0.01 wt. %)) were blended with 2.0 parts by weight of tris(2,4-di-t-butylphenyl)phosphite, 0.5 parts by weight of calcium hypophosphite and 0.5 parts by weight of adipic acid. Block copolymer pellets were prepared thereafter by the same operations as in Example 1. Characteristics of polymer components and block copolymer, and evaluation results of the resulting molding are shown in Table 3.

EXAMPLE 9

10.5 Kg of an equimolar mixture of hexamethylenediamine-adipic acid and 4.5 kg of an equimolar mixture of hexamethylenediamine-isophthalic acid were used as polyamide raw materials. An aqueous solution of the polyamide raw materials was charged into a 70-1 autoclave with a stirring device and heated from 50° C. up to about 150° C. with stirring after being thoroughly flushed with nitrogen at 50° C., where heating was continued while removing water to the system outside so that the pressure in the autoclave may not exceed about 0.2 Mpa. As a result, about 7 kg was removed. Then, heating was continuously carried out up to about 270° C. for about one hour while removing water to the system outside so that the pressure in the autoclave may not exceed about 1.77 Mpa. Then, the pressure was reduced to atmospheric pressure over about one hour, and the stirring was discontinued. Strand-formed polymer was discharged through a nozzle at the lower part, followed by water cooling and cutting to obtain polyamide 66/6I random copolymerization polyamide with a moisture content of 0.4 wt. %.

100 Parts by weight of polymer components consisting of 90 parts by weight of the resulting polyamide 66/6I random copolymer (abbreviated to "PA66/6I" in the following Tables) and 10 parts by weight of polyamide 6I (T40, made by Bayer (moisture content: 0.01 wt. %)) were blended with 2.0 parts by weight of tris(2,4-di-t-butylphenyl)phosphite, 0.5 parts by weight of calcium hypophosphite and 0.5 parts by weight of adipic acid. Block copolymer pellets were prepared thereafter by the same operations as in Example 1. Characteristics of polymer components and block copolymer, and evaluation results of the resulting molding are shown in Table 3.

EXAMPLE 10

100 Parts by weight of polymer components consisting of 64 parts by weight of water absorption-treated polyamide 66 (Leona 1300, made by ASAHI KASEI Corp. (moisture content: 1.0 wt. %)), 27 parts by weight of polyamide 6I (T40, made by Bayer (moisture content: 0.01 wt. %)) and 9 parts by weight of polyamide 6 (SF1013A, made by Ube Industries, Ltd. (moisture content: 0.08 wt. %)) were blended with 2.0 parts by weight of tris(2,4-di-t-butylphenyl)phosphite and 0.5 parts by weight of calcium hypophosphite. Block copolymer pellets were prepared thereafter by the same operations as in Example 3. Characteristics of polymer components and block copolymer, and evaluation results of the resulting molding are shown in Table 3.

EXAMPLE 11

100 Parts by weight of polymer components consisting of 70 parts by weight of polyamide 66 (Leona 1300, made by ASAHI KASEI Corp. (moisture content: 0.08 wt. %)) and 30 parts by weight of polyamide 6 (SF1013A, made by Ube Industries, Ltd. (moisture content: 0.08 wt. %)) were blended with 2.0 parts by weight of tris(2,4-di-t-butylphenyl)phosphite, 0.5 parts by weight of calcium hypophosphite and 0.5 parts by weight of adipic acid. Block copolymer pellets were prepared thereafter by the same operations as in Example 1. Characteristics of polymer components and block copolymer, and evaluation results of the resulting molding are shown in Table 3.

EXAMPLE 12

100 Parts by weight of polymer components consisting of 70 parts by weight of polyamide 66 (Leona 1300, made by ASAHI KASEI Corp. (moisture content: 0.08 wt. %)) and 30 parts by weight of polyethylene terephthalate (NEH-2050, made by Unitika, Ltd. (moisture content: 0.01 wt. %), abbreviated to "PET" in the following Tables) were blended with 2.0 parts by weight of tris(2,4-di-t-butylphenyl)phosphite and 0.5 parts by weight of calcium hypophosphite. The blend was melt kneaded by a biaxial extruder (model TEM35, made by Toshiba Machine Co., Ltd., biaxial unidirectional screw-rotary type, L/D=47.6 (D=37 mm in diameter)), while feeding 50 parts by weight of short glass fibers (JA416, made by Asahi Fiber Glass Co., Ltd.) through a side feeder on the basis of 100 parts by weight of the polymer components. Extrusion was carried out at a screw revolution rate of 300 rpm, a cylinder temperature of 280° C. (a polymer temperature of 290° C. around the tip end nozzle), and a rate of 60 kg/hr (for a retention time of 2 minutes) without pressure reduction. Strand-formed polymer was discharged through the tip end nozzle, followed by water cooling and cutting to make pellets. The pellets were dried in a nitrogen atmosphere at 80° C. for 24 hours.

Glass transition temperature $Tg^{(B)}_1$ of polyamide 66=47.0° C. and glass transition temperature $Tg^{(B)}_2$ of polyethylene terephthalate=81.0° C. Thus, parameter X=(47.0×0.7)+(81.0×0.3)=57.2° C. was calculated. Number of glass transition temperature of the resulting block copolymer pellets was two (m=2), and the values were $Tg_1$=50.1° C. and $Tg_2$=73.1° C., respectively. Thus, among the glass transition temperatures of polyamide 66 and polyethylene terephthalate, the glass transition temperature of polyamide 66 was nearer to the glass transition temperature $Tg_1$ of the block copolymer, whereas the glass transition temperature of polyethylene terephthalate was nearer to the glass transition temperature $Tg_2$ of the block copolymer. Thus, $Tg^{(A)}_1$=47.0° C. and $Tg^{(A)}_2$=81.0° C. Parameter $Y=(1/m)\times\{(|Tg_1-X|/|Tg^{(A)}_1-X|)+(|Tg_2-X|/|Tg^{(A)}_2-X|)\}=(1/2)\times\{(|50.1-57.2|/|47.0-57.2|)+(73.1-57.2|/|81.0-57.2|)\}=0.68$ was calculated.

Average sequence length determined by $^{13}$C—NMR, using d-hexafluoroisopropanol as a solvent was 22.5. Evaluation results of the resulting molding are shown in Table 4.

EXAMPLE 13

100 Parts by weight of polymer components consisting of 60 parts by weight of polyamide 66 (Leona 1300, made by ASAHI KASEI Corp. (moisture content: 0.08 wt. %)) and 40 parts by weight of polyethylene terephthalate (NEH-2050, made by Unitika, Ltd. (moisture content: less than 0.01 wt. %) were blended with 2.0 parts by weight of tris(2,4-di-t-butylphenyl)phosphite and 0.5 parts by weight of calcium hypophosphite. Block copolymer pellets were prepared thereafter by the same operations as in Example 12. Characteristics of polymer components and block copolymer, and evaluation results of the resulting molding are shown in Table 4.

EXAMPLE 14

100 Parts by weight of polymer components consisting of 70 parts by weight of polyamide 66 (Leona 1300, made by ASAHI KASEI Corp. (moisture content 0.08 wt. %)) and 30 parts by weight of regenerated polyethylene terephthalate (powders of recycled beverage bottles (moisture content: less than 0.01 wt. %)) were blended with 2.0 parts by weight of tris(2,4-di-t-butylphenyl)phosphite and 0.5 parts by weight of calcium hypophosphite. Block copolymer pellets were prepared thereafter by the same operations as in Example 12. Characteristics of polymer components and block copolymer, and evaluation results of the resulting molding are shown in Table 4.

EXAMPLE 15

Block copolymer pellets were prepared in the same manner as in Example 12 except that polytrimethylene terephthalate (CP-BR, made by Shell (moisture content: less than 0.01 wt. %), abbreviated to "PTT" in the following Tables) was used in place of polyethylene terephthalate (NEH-2050, made by Unitika, Ltd.). Characteristics of polymer components and block copolymer, and evaluation results of the resulting molding are shown in Table 4.

EXAMPLE 16

Block copolymer pellets were prepared in the same manner as in Example 12 except that polybutylene terephthalate (1401-X06, made by Toray Industries, Inc. (moisture content: less than 0.01 wt. %), abbreviated to "PBT" in the following Tables) was used in place of polyethylene terephthalate (NEH-2050, made by Unitika, Ltd.). Characteristics of polymer components and block copolymer, and evaluation results of the resulting molding are shown in Table 5.

EXAMPLE 17

100 Parts by weight of polymer components consisting of 50 parts by weight of polyethylene terephthalate (NEH-2050, made by Unitika, Ltd. (moisture content: less than 0.01 wt. %)) and 50 parts by weight of polytrimethylene terephthalate (CP-BR, made by Shell (moisture content: less than 0.01 wt. %)) were blended with 2.0 parts by weight of tris(2,4-di-t-butylphenyl)phosphite and 0.5 parts by weight of calcium hypophosphite. Block copolymer pellets were prepared thereafter in the same manner as in Example 12. Characteristics of polymer components and block copolymer, and evaluation results of the resulting molding are shown in Table 5.

Comparative Example 2

Block copolymer pellets were prepared in the same manner as in Example 12 only from 100 parts by weight of polymer components consisting of 50 parts by weight of polyethylene terephthalate (NEH-2050, made by Unitika, Ltd. (moisture content: less than 0.01 wt. %)) and 50 parts by weight of polytrimethylene terephthalate (CP-BR, made by Shell (moisture content: less than 0.01 wt. %)). Characteristics of polymer components and block copolymer, and evaluation results of the resulting molding are shown in Table 5.

EXAMPLE 18

100 Parts by weight of polymer components consisting of 30 parts by weight of polycarbonate (Iupilon S-2000, made by Mitsubishi Engineering Plastic Co., Ltd., abbreviated to "PC" in the following Tables) and 70 parts by weight of polybutylene terephthalate (1401-X06, made by Toray Industries, Inc.) were blended with 0.5 parts by weight of tris(2,4-di-t-butylphenyl)-phosphite and 0.5 parts by weight of calcium hypophosphite. The blend was extruded by a biaxial extruder (model TEM35, made by Toshiba Machine Co., Ltd., biaxial, unidirectional screw-rotary type, L/D= 46.7 (D=37 mm in diameter)) under such conditions as screw revolution rate: 300 rpm, cylinder temperature: 280° C. (polymer temperature around the tip end nozzle=290° C.), rate: 60 kg/hr (retention time: 2 minutes) and pressure reduction degree: 0.01 Mpa. Strand-formed polymer was discharged through the tip end nozzle, followed by water cooling and cutting to make pellets. The pellets were dried in a nitrogen atmosphere at 80° C. Average sequence length determined by $^{13}$C—NMR, using d-chloroform as a solvent was 35.0. Characteristics of polymer components and block copolymer, and evaluation results of the resulting molding are shown in Table 6.

EXAMPLE 19

100 Parts by weight of polymer components consisting of 50 parts by weight of polycarbonate (Iupilon S-2000, made by Mitsubishi Engineering Plastic Co., Ltd.) and 50 parts by weight of polybutylene terephthalate (1401-X06, made by Toray Industries, Inc.) were blended with 0.5 parts by weight of tris(2,4-di-t-butylphenyl)phosphite and 0.5 parts by weight of calcium hypophosphite. Block copolymer pellets were prepared thereafter by the same operations as in Example 18. Characteristics of polymer components and block copolymer, and evaluation results of the resulting molding are shown in Table 6.

EXAMPLE 20

Block copolymer pellets were prepared in the same manner as in Example 18 except that polytrimethylene terephthalate (CP-BR, made by Shell) was used in place of polybutylene terephthalate (1401-X06, made by Toray Industries, Inc.). Characteristics of polymer components and block copolymer, and evaluation results of the resulting molding are shown in Table 6.

EXAMPLE 21

100 Parts by weight of polymer components consisting of 30 parts by weight of polycarbonate (Iupilon S-2000, made by Mitsubishi Engineering Plastic Co., Ltd.) and 70 parts by weight of polybutylene terephthalate (1401-X06, made by Toray Industries, Inc.) were blended with 0.5 parts by weight of tris(2,4-di-t-butylphenyl)phosphite and 0.5 parts by weight of zinc phosphite. Block copolymer pellets were prepared thereafter by the same operations as in Example 13. Average sequence length determined by $^{13}$C—NMR, using d-chloroform as a solvent was 12.5. Characteristics of polymer components and block copolymer, and evaluation results of the resulting molding are shown in Table 7.

Comparative Example 3

Block copolymer pellets were prepared in the same manner as in Example 13 except that 100 parts by weight consisting of 30 parts by weight of polycarbonate (Iupilon S-2000, made by Mitsubishi Engineering Plastic Co., Ltd.) and 70 parts by weight of polybutylene terephthalate (1401-Z06, made by Toray Industries, Inc.) was only used without blending with tris(2,4-di-t-butylphenyl)phosphite and calcium hypophosphite. Average sequence length determined by $^{13}$C—NMR, using d-chloroform as a solvent was 4.5. Characteristics of polymer component and block copolymer, and evaluation results of the resulting molding are shown in Table 7.

TABLE 1

|  | Example 1 | Example 2 | Example 3 | Comp. Ex. 1 |
|---|---|---|---|---|
| (A) Polymer components Number of polymer components: n | 2 | 2 | 2 | 2 |
| Kind of polymer components | (1) PA66 (2) PA6I | (1) PA66 (2) PA6I | (1) PA66 (2) PA6I | (1) PA66 (2) PA6I |
| Glass transition temp. of polymer components (° C.) | (1) 47.0 (2) 130 | (1) 47.0 (2) 130 | (1) 47.0 (2) 130 | (1) 47.0 (2) 130 |
| Mixing ratio of polymer components: $W_I$ | (1) 0.7 (2) 0.3 | (1) 0.6 (2) 0.4 | (1) 0.7 (2) 0.3 | (1) 0.6 (2) 0.4 |
| Parameter X (° C.) | 71.9 | 80.2 | 71.9 | 80.2 |
| (B) Kind of phosphite ester compound | B-1 | B-1 | B-1 | — |
| Mixing ratio to 100 parts by wt of polymer component (parts by wt.) | 1.0 | 1.0 | 1.0 | — |
| (C) Kind of phosphite metal salt or hypo-phosphite metal salt | Ca hypo-phosphite | Ca hypo-phosphite | Ca hypo-phosphite | Ca hypo-phosphite |
| Mixing ratio to 100 parts by wt of polymer component (parts by wt.) | 0.5 | 0.5 | 0.5 | 0.5 |
| (D) Kind of molecular weight controlling agent | Adipic acid | Adipic acid | — | Adipic acid |
| Mixing ratio to 100 parts by wt of polymer component (parts by wt.) | 0.5 | 0.5 | — | 0.5 |
| (E) Kind of other mixing material | GF | GF | GF | GF |
| Mixing ratio to 100 parts by wt of polymer component (parts by wt.) | 100 | 100 | 100 | 100 |
| Characteristics of block copolymer Weight average molecular wt. (Mw) | 32000 | 32000 | 38000 | 40000 |
| Number of glass transition temp.: m | 1 | 1 | 1 | 2 |
| Glass transition temp. (° C.) | 62.0 | 68.0 | 63.0 | 52.0 128.5 |
| Parameter Y | 0.40 | 0.37 | 0.36 | 0.91 |
| Melting point (° C.) | 252 | 250 | 247 | 259 |
| Physical properties of molding Flexural modulus (23° C.) (Gpa) | 15.0 | 15.0 | 15.0 | 15.0 |
| Flexural modulus (80° C.) (Gpa) | 12.0 | 13.0 | 11.7 | 12.0 |
| Tensile strength (Mpa) | 230 | 230 | 230 | 190 |
| Tensile elongation (%) | 6.5 | 6.5 | 6.5 | 5.5 |
| Notched Izod impact strength (23° C.) (J/m) | 90 | 90 | 90 | 75 |

TABLE 1-continued

|  | Example 1 | Example 2 | Example 3 | Comp. Ex. 1 |
|---|---|---|---|---|
| Appearance | 75 | 75 | 75 | 35 |
| Color tone (value b) | −3.0 | −3.0 | −3.0 | 2.5 |
| Water absorption (23° C. × 24 hr) (wt. %) | 1.00 | 0.90 | 1.02 | 1.25 |

B-1: Tridecyl phosphite

TABLE 2

|  | Example 4 | Example 5 | Example 6 | Example 7 |
|---|---|---|---|---|
| (A) Polymer components Number of polymer components: n | 2 | 2 | 2 | 2 |
| Kind of polymer components | (1) PA66 (2) PA6I | (1) PA66 (2) PA6I | (1) PA66 (2) PA6I | (1) PA66 (2) PA6I |
| Glass transition temp. of polymer components (° C.) | (1) 47.0 (2) 130 | (1) 47.0 (2) 130 | (1) 47.0 (2) 130 | (1) 47.0 (2) 130 |
| Mixing ratio of polymer components: $W_i$ | (1) 0.7 (2) 0.3 | (1) 0.7 (2) 0.3 | (1) 0.7 (2) 0.3 | (1) 0.7 (2) 0.3 |
| Parameter X (° C.) | 71.9 | 71.9 | 71.9 | 71.9 |
| (B) Kind of phosphite ester compound | B-2 | B-3 | B-1 | B-1 |
| Mixing ratio to 100 parts by wt of polymer component (parts by wt.) | 1.0 | 1.0 | 1.0 | 1.0 |
| (C) Kind of phosphite metal salt or hypo-phosphite metal salt | Ca hypo-phosphite | Ca hypo-phosphite | Ca hypo-phosphite | Zn phosphate |
| Mixing ratio to 100 parts by wt of polymer component (parts by wt.) | 0.5 | 0.5 | 0.5 | 0.5 |
| (D) Kind of molecular weight controlling agent | Adipic acid | Adipic acid | Adipic acid | Adipic acid |
| Mixing ratio to 100 parts by wt of polymer component (parts by wt.) | 0.5 | 0.5 | 0.5 | 0.5 |
| (E) Kind of other mixing material | GF | GF | GF | GF |
| Mixing ratio to 100 parts by wt of polymer component (parts by wt.) | 100 | 100 | 100 | 100 |
| Characteristics of block copolymer Weight average molecular wt. (Mw) | 32000 | 32000 | 32000 | 32000 |
| Number of glass transition temp.: m | 1 | 1 | 1 | 1 |
| Glass transition temp. (° C.) | 62.0 | 62.0 | 61.0 | 60.0 |
| Parameter Y | 0.40 | 0.40 | 0.44 | 0.48 |
| Melting point (° C.) | 252 | 252 | 254 | 255 |
| Physical properties of polymer components Flexural modulus (23° C.) (Gpa) | 15.0 | 15.0 | 15.0 | 15.0 |
| Flexural modulus (80° C.) (Gpa) | 12.0 | 12.0 | 11.5 | 11.0 |
| Tensile strength (Mpa) | 230 | 230 | 220 | 215 |
| Tensile elongation (%) | 6.5 | 6.5 | 6.5 | 6.0 |
| Notched Izod impact strength (23° C.) (J/m) | 90 | 90 | 90 | 80 |
| Appearance | 75 | 75 | 70 | 60 |
| Color tone (value b) | −3.0 | −3.0 | −2.0 | −1.0 |
| Water absorption (23° C. × 24 hr) (wt. %) | 1.00 | 1.00 | 1.10 | 1.20 |

B-1: Tridecyl phosphit
B-2: Triphenyl phosphite
B-3: Tris (2,4-di-t-butylphenyl) phosphite

TABLE 3

|  | Example 8 | Example 9 | Example 10 | Example 11 |
|---|---|---|---|---|
| (A) Polymer components Number of polymer components: n | 2 | 2 | 2 | 2 |
| Kind of polymer components | (1) PA6 (2) PA6I | (1) PA66/6I (1) PA6I | (1) PA66 (2) PA6I (3) PA6 | PA66 (2) PA6 |
| Glass transition temp. of polymer components (° C.) | (1) 43.0 (2) 130 | (1) 67.0 (2) 130 | (1) 47.0 (2) 130 (3) 43.0 | (1) 47.0 (2) 43.0 |
| Mixing ratio of polymer components: $W_I$ | (1) 0.7 (2) 0.3 | (1) 0.9 (2) 0.1 | (1) 0.64 (2) 0.27 (3) 0.09 | (1) 0.7 (2) 0.3 |
| Parameter X (° C) | 69.1 | 73.3 | 69.1 | 45.8 |
| (B) Kind of phosphite ester compound | B-3 | B-3 | B-3 | B-3 |
| Mixing ratio to 100 parts by wt of polymer compounds (parts by wt.) | 2.0 | 2.0 | 2.0 | 2.0 |
| (C) Kind of phosphite metal salt or hypo-phosphite metal salt | Na hypo-phosphite | Ca hypo-phosphite | Ca hypo-phosphite | Ca hypo-phosphite |
| Mixing ratio to 100 parts by wt of polymer component (parts by wt.) | 0.5 | 0.5 | 0.5 | 0.5 |
| (D) Kind of molecular weight controlling agent | Adipic acid | Adipic acid | — | Adipic acid |
| Mixing ratio to 100 parts by wt of polymer component (parts by wt.) | 0.5 | 0.5 | — | 0.5 |
| (E) Kind of other mixing material | GF | GF | GF | GF |
| Mixing ratio to 100 parts by wt of polymer component (parts by wt.) | 100 | 100 | 100 | 100 |
| Characteristics of block copolymer Weight average molecular wt. (Mw) | 32000 | 32000 | 40000 | 32000 |
| Number of glass transition temp.: m | 1 | 1 | 1 | 1 |
| Glass transition temp. (° C.) | 61.0 | 70.0 | 66.0 | 46.0 |
| Parameter Y | 0.31 | 0.52 | 0.14 | 0.17 |
| Melting point (°C.) | 215 | 217 | 240 | 250 |
| Physical properties of molding Flexural modulus (23° C.) (Gpa) | 14.0 | 15.0 | 15.0 | 14.0 |
| Flexural modulus (80° C.) (Gpa) | 10.0 | 12.0 | 11.5 | 8.5 |
| Tensile strength (Mpa) | 200 | 230 | 220 | 220 |
| Tensile elongation (%) | 7.5 | 6.5 | 7.0 | 7.5 |
| Notched Izod impact strength (23° C.) (J/m) | 90 | 80 | 85 | 85 |
| Appearance | 80 | 85 | 85 | 75 |
| Color tone (value b) | −3.0 | −3.0 | −3.0 | −3.0 |
| Water absorption (23° C. × 24 hr) (wt. %) | 1.15 | 1.00 | 1.00 | 1.35 |

B-3: Tris (2,4-di-t-butylphenyl) phosphite

TABLE 4

|  | Example 12 | Example 13 | Example 14 | Example 15 |
|---|---|---|---|---|
| (A) Polymer components Number of polymer components: n | 2 | 2 | 2 | 2 |
| Kind of polymer components | (1) PA66 (2) PET | (1) PA66 (2) PET | (1) PA66 (2) PET | (1) PA66 (2) PTT |
| Glass transition temp. of polymer components (° C.) | (1) 47.0 (2) 81.0 | (1) 47.0 (2) 81.0 | (1) 47.0 (2) 80.0 | (1) 47.0 (2) 42.0 |

TABLE 4-continued

|  | Example 12 | Example 13 | Example 14 | Example 15 |
|---|---|---|---|---|
| Mixing ratio of polymer components: $W_I$ | (1) 0.7 (2) 0.3 | (1) 0.6 (2) 0.4 | (1) 0.7 (2) 0.3 | (1) 0.7 (2) 0.3 |
| Parameter X (° C.) | 57.2 | 60.6 | 56.9 | 45.5 |
| (B) Kind of phosphite ester compound | B-3 | B-3 | B-3 | B-3 |
| Mixing ratio to 100 parts by wt of polymer component (parts by wt.) | 2.0 | 2.0 | 2.0 | 2.0 |
| (C) Kind of phosphite metal salt or hypo-phosphite metal salt | Ca hypo-phosphite | Ca hypo-phosphite | Ca hypo-phosphite | Ca hypo-phosphite |
| Mixing ratio to 100 parts by wt of polymer component (parts by wt.) | 0.5 | 0.5 | 0.5 | 0.5 |
| (D) Kind of molecular weight controlling agent | — | — | — | — |
| Mixing ratio to 100 parts by wt of polymer component (parts by wt.) | — | — | — | — |
| (E) Kind of other mixing material | GF | GF | GF | GF |
| Mixing ratio to 100 parts by wt of polymer component (parts by wt.) | 50 | 50 | 50 | 50 |
| Characteristics of block copolymer Weight average molecular wt. (Mw) | 32000 | 32000 | 38000 | 32000 |
| Number of glass transition temp.: m | 2 | 2 | 2 | 1 |
| Glass transition temp. (° C.) | 73.1 50.1 | 72.5 49.8 | 73.0 49.7 | 46.5 |
| Parameter Y | 0.68 | 0.69 | 0.71 | 0.67 |
| Melting point (° C.) | 230 | 228 | 230 | 248 224 |
| Physical properties of molding Flexural modulus (23° C.) (Gpa) | 8.75 | 8.75 | 8.75 | 8.5 |
| Tensile strength (Mpa) | 150 | 140 | 150 | 175 |
| Tensile elongation (%) | 6.8 | 6.3 | 6.8 | 6.8 |
| Notched Izod impact strength (23° C.) (J/m) | 50 | 50 | 50 | 60 |
| Appearance | 65 | 65 | 65 | 70 |
| Color tone (value b) | −3.5 | −3.5 | −2.0 | −3.5 |
| Water absorption (24 hr in water) (wt. %) | 0.37 | 0.35 | 0.37 | 0.37 |
| Development state of environmental stress cracks | a few cracks | a few cracks | a few cracks | No cracks |

B-3: Tris (2,4-di-t-butylphenyl) phosphite

TABLE 5

|  | Example 16 | Example 17 | Comp. Ex. 2 |
|---|---|---|---|
| (A) Polymer components Number of polymer components: n | 2 | 2 | 2 |
| Kind of polymer components | (1) PA66 (2) PBT | (1) PET (2) PIT | (2) PET (2) PTT |
| Glass transition temp. of polymer components (° C.) | (1) 47.0 (2) 25.0 | (1) 80.0 (2) 42.0 | (1) 80.0 (2) 42.0 |
| Mixing ratio of polymer components: $W_I$ | (1) 0.7 (2) 0.3 | (1) 0.5 (2) 0.5 | (1) 0.5 (2) 0.5 |
| Parameter X (° C.) | 40.4 | 61.0 | 61.0 |
| (B) Kind of phosphite ester compound | B-3 | B-3 | — |
| Mixing ratio to 100 parts by wt of polymer component (parts by wt.) | 2.0 | 2.0 | — |

TABLE 5-continued

|  | Example 16 | Example 17 | Comp. Ex. 2 |
|---|---|---|---|
| (C) Kind of phosphite metal salt or hypo-phosphite metal salt | Ca-hypo phosphite | Ca-hypo phosphite | — |
| Mixing ratio to 100 parts by wt of polymer component (parts by wt.) | 0.5 | 0.5 | — |
| (D) Kind of molecular weight controlling agent | — | — | — |
| Mixing ratio to 100 parts by wt of polymer component (parts by wt.) | — | — | — |
| (E) Kind of other mixing material | GF | GF | GF |
| Mixing ratio to 100 parts by wt of polymer component (parts by wt.) | 50 | 50 | 50 |
| Characteristics of block copolymer Weight average molecular wt. (Mw) | 38000 | 35000 | 35000 |
| Number of glass transition temp.: m | 2 | 1 | 1 |
| Glass transition temp. (° C.) | 45.5 26.0 | 58 | 60 |
| Parameter Y | 0.85 | 0.16 | 0.05 |
| Melting point (° C.) | 250 224 | 245 | 240 |
| Physical properties of molding Flexural modulus (23° C.) (Gpa) | 8.5 | 9.5 | 8.5 |
| Tensile strength (Mpa) | 210 | 160 | 130 |
| Tensile elongation (%) | 6.8 | 6.0 | 6.0 |
| Notched Izod impact strength (23° C.) (J/m) | 60 | 50 | 50 |
| Appearance | 60 | 75 | 75 |
| Color tone (value b) | −2.0 | −3.0 | 18.0 |
| Water absorption (24 hr in water) (wt. %) | 0.37 | 0.02 | 0.05 |
| Development state of environmental stress cracks | No cracks | No cracks | Cracks occurred |

B-3: Tris (2,4-di-t-dibutyl) phosphite

TABLE 6

|  | Example 18 | Example 19 | Example 20 |
|---|---|---|---|
| (A) Polymer components Number of polymer components: n | 2 | 2 | 2 |
| Kind of polymer components | (1) PC (2) PBT | (1) PC (2) PBT | (3) PC (2) PTT |
| Glass transition temp. of polymer camponents (° C.) | (1) 150 (2) 25.0 | (1) 150 (2) 25.0 | (1) 150 (2) 42.0 |
| Mixing ratio of polymer components: $W_I$ | (1) 0.3 (2) 0.7 | (1) 0.5 (2) 0.5 | (1) 0.3 (2) 0.7 |
| Parameter X (° C.) | 62.5 | 87.5 | 74.4 |
| (B) Kind of phosphite ester compound | B-3 | B-3 | B-3 |
| Mixing ratio to 100 parts by wt of polymer component (parts by wt.) | 0.5 | 0.5 | 0.5 |
| (C) Kind of phosphite metal salt or hypo-phosphite metal salt | Ca hypo-phosphite | Ca hypo-phosphite | Ca hypo-phosphite |
| Mixing ratio to 100 parts by wt of polymer component (parts by wt.) | 0.5 | 0.5 | 0.5 |
| (D) Kind of molecular weight controlling agent | — | — | — |
| Mixing ratio to 100 parts by wt of polymer component (parts by wt.) | — | — | — |

TABLE 6-continued

|  | Example 18 | Example 19 | Example 20 |
|---|---|---|---|
| (E) Kind of other mixing material | — | — | — |
| Mixing ratio to 100 parts by wt of polymer component (parts by wt.) | — | — | — |
| Characteristics of block copolymer Weight average molecular wt. (Mw) | 22000 | 22000 | 22000 |
| Number of glass transition temp.: m | 2 | 2 | 2 |
| Glass transition temp. (° C.) | 110 50.3 | 115 48.5 | 137 46.5 |
| Parameter Y | 0.43 | 0.53 | 0.84 |
| Melting point (° C.) | 223 | 220 | 226 |
| Physical properties of molding Flexural modulus (23° C.) (Gpa) | 2.8 | 2.8 | 2.8 |
| Flexural modulus (80° C.) (Gpa) | 1.10 | 1.25 | 1.10 |
| Tensile strength (Mpa) | 67 | 67 | 67 |
| Tensile elongation (%) | 8.0 | 8.0 | 8.0 |
| Notched Izod impact strength (23° C.) (J/m) | 45 | 98 | 45 |
| Appearance | 90 | 90 | 90 |
| Color tone (value b) | −2.5 | −2.5 | −2.5 |

B-3: Tris (2,4-di-t-butylphenyl) phosphite

TABLE 7

|  | Example 21 | Comp. Ex. 3 |
|---|---|---|
| (A) Polymer components Number of polymer components: n | 2 | 2 |
| Kind of polymer components | (1) PC (2) PBT | (1) PC (2) PBT |
| Glass transition temp. of polymer components (° C.) | (1) 150 (2) 25.0 | (1) 150 (2) 25.0 |
| Mixing ratio of polymer components: $W_I$ | (1) 0.3 (2) 0.7 | (1) 0.3 (2) 0.7 |
| Parameter X (° C.) | 62.5 | 62.5 |
| (B) Kind of phosphite ester compound | B-3 | — |
| Mixing ratio to 100 parts by wt of polymer component (parts by wt.) | 0.5 | — |
| (C) Kind of phosphite metal salt or hypo-phosphite salt | Zn phosphite | — |
| Mixing ratio to 100 parts by wt of polymer component (parts by wt.) | 0.5 | — |
| (D) Kind of molecular weight controlling agent | — | — |
| Mixing ratio to 100 parts by wt of polymer component (parts by wt.) | — | — |
| (E) Kind of other mixing material | — | — |
| Mixing ratio to 100 parts by wt of polymer component (parts by wt.) | — | — |
| Characteristics of block copolymer Weight average molecular wt. (Mw) | 22000 | 22000 |
| Number of glass transition temp.: m | 2 | 1 |
| Glass transition temp. (° C.) | 90.5 58.0 | 60.2 |
| Parameter Y | 0.22 | 0.06 |
| Melting point (° C.) | 220 | 217 |
| Physical properties of molding Flexural modulus (23° C.) (Gpa) | 2.8 | 2.8 |
| Flexural modulus (80° C.) (Gpa) | 0.90 | 0.75 |
| Tensile strength (Mpa) | 67 | 67 |
| Tensile elongation (%) | 8.0 | 8.0 |
| Notched Izod impact strength (23° C.) (J/m) | 38 | 40 |
| Appearance | 90 | 90 |
| Color tone (value b) | 0.2 | 18.0 |

B-3: Tris (2,4-di-t-butylphenyl) phosphite

INDUSTRIAL UTILITY

The present block copolymer has good moldability and can be simply and economically produced from rework products or recycle products as raw materials. Furthermore, moldings obtained from the present block copolymer are distinguished in hot regidity, heat resistance, chemical resistance, surface appearance, etc.

Thus, it is expectable that the present block copolymer can satisfy any of the requirements such as reworking or recycling of parts, and higher performance and higher functionalization of resin materials in various applications to versatile consumer fields of packaging, containers, etc., parts for automobile exterior furnishing and sheets, parts for automobile interior furnishing, parts for automobile underhood, parts for two-wheeler bicycles, parts for furniture, parts for the field of OA appliances, parts for electronic appliances, parts for industrial products, etc.

What is claimed is:

1. A block copolymer composition comprising a block copolymer, which is obtained by melt kneading (A), (B) and (C), wherein (A) is at least two polymers having different structural units, wherein said at least two polymers are polyamide(s), polyester(s), polycarbonate(s) or polyarylate(s), wherein (B) is a phosphite ester compound and wherein (C) is a phosphite metal salt and/or a hypophosphite metal salt, and wherein the block copolymer satisfies the following formula (1):

$$Y = \frac{1}{m}\sum_{j=1}^{m}\left|\frac{Tg_j - X}{Tg_j^{(A)} - X}\right|$$

wherein Y is 0.1–0.9 and m is the number of glass transition temperatures of the block copolymer; $Tg_j$ is each glass transition temperature of the block copolymer; $Tg^{(A)}_j$ is the glass transition temperature of the polymer of (A) that is closest to the $Tg_j$; and X is given by the following formula (2):

$$X = \sum_{i=1}^{n} Tg^{(B)}{}_i w_i$$

n is the number of polymer components of (A); $Tg^{(B)}{}_i$ is the glass transition temperature of each individual polymer of (A); and $w_i$ is the weight ratios of the individual polymers of (A); and wherein (C) is at least one metal salt of phosphorous acid or hypophosphorous acid.

2. A block copolymer composition according to claim 1, wherein the difference in the glass transition temperature between the polymer components constituting the block copolymer is 50° C. or higher.

3. A block copolymer composition according to claim 1, wherein the block copolymer has a weight average molecular weight (Mw) of 20,000–200,000.

4. A block copolymer composition according to claim 1, wherein the block copolymer comprises at least two kinds of polyamides.

5. A block copolymer composition according to claim 1, wherein the block copolymer comprises polyamide and polyester.

6. A block copolymer composition according to claim 1, wherein the block copolymer comprises at least two kinds of polyesters.

7. A block copolymer composition according to claim 1, wherein the block copolymer comprises polyester and polycarbonate.

8. A block copolymer composition according to claim 1, wherein the polyamide is selected from the group consisting of polycaprolactam, polyhexamethylene adipamide, polyhexamethylene dodecamide, polyhexamethylene isophthalamide, polyhexamethylene terephthalamide, polyhexamethylene cyclohexylamide and their copolymers.

9. A block copolymer composition according to claim 1, wherein the polyester is selected from the group consisting of polyethylene terephthalate, polytrimethylene terephthalate and polybutylene terephthalate.

10. A block copolymer composition according to claim 1, wherein the block copolymer has an average sequence length of 10–50 determined by nuclear magnetic resonance ($^{13}$C-NMR).

11. A block copolymer according to claim 1, wherein (A) consists of two kinds of polyamides or two kinds of polyesters.

12. A process for producing a block copolymer according to claim 13, wherein (A) consists of two kinds of polyamides or two kinds of polyesters.

13. A process for producing a block copolymer, which comprises melt kneading (A) at least two kinds of polymer components each having a different structural unit in the polymer and selected from the group consisting of polyamide, polyester, polycarbonate and polyarylate, with (B) a phosphite ester compound and (C) at least one metal salt of phosphorous acid or hypophosphorous acid.

14. A process for producing a block copolymer according to claim 13, wherein the polymer component (A) are at least two kinds of polyamides.

15. A process for producing a block copolymer according to claim 13, wherein the polymer components (A) are polyamide and polyester.

16. A process for producing a block copolymer according to claim 13, wherein the polymer components (A) are at least two kinds of polyesters.

17. A process for producing a block copolymer according to claim 13, wherein the polymer components (A) are polyester and polycarbonate.

18. A process for producing a block copolymer according to claim 13, wherein the proportion of the component (B) is 0.05–10 parts by weight and the proportion of the component (C) is 0.05–10 parts by weight on the basis of 100 parts by weight of the polymer components (A).

19. A process for producing a block copolymer according to claim 13, wherein at least one molecular weight controlling agent (D) is further melt kneaded, and the molecular weight controlling agent (D) is selected from the group consisting of water, monocarboxylic acid, dicarboxylic acid, monoamine, diamine, and carboxylic acid metal salt.

20. A process for producing a block copolymer according to claim 19, wherein the proportion of the component (D) is 0.05–10 parts by weight on the basis of 100 parts by weight of the polymer components (A).

* * * * *